United States Patent [19]
Chhabra et al.

[11] Patent Number: 6,036,886
[45] Date of Patent: Mar. 14, 2000

[54] MICROEMULSION METHOD FOR PRODUCING ACTIVATED METAL OXIDE NANOCRYSTALS

[75] Inventors: Vishal Chhabra, College Point; Bharati S. Kulkarni, Cortlandt Manor; Rameshwar Nath Bhargava, Briarcliff Manor, all of N.Y.

[73] Assignee: Nanocrystals Technology L.P., Briarccliff Manor, N.Y.

[21] Appl. No.: 09/124,472

[22] Filed: Jul. 29, 1998

[51] Int. Cl.[7] ...................................................... C01G 1/02
[52] U.S. Cl. .................. 252/301.4 R; 423/243; 423/592; 423/593
[58] Field of Search ...................... 252/301.4 R; 423/263, 423/592, 593

[56] References Cited

U.S. PATENT DOCUMENTS

| | | | |
|---|---|---|---|
| 4,032,471 | 6/1977 | Luckey et al. | 252/301.4 R |
| 5,413,736 | 5/1995 | Nishisu et al. | 252/301.4 R |
| 5,545,386 | 8/1996 | Kaneyoshi et al. | 423/263 |
| 5,637,258 | 6/1997 | Goldbert et al. | 252/301.4 R |
| 5,770,172 | 6/1998 | Linehan et al. | 423/634 |

OTHER PUBLICATIONS

Pillai et al, "Magnetic Properties of Barium Ferrite Synthesized Using a Microemulsion Mediated Process", Jour. Mag. and Mag. Matl., 116, L299–304, 1992 no month.

*Primary Examiner*—C. Melissa Koslow
*Attorney, Agent, or Firm*—William L. Botjer

[57] ABSTRACT

A process for the production of metal oxide nanocrystals activated with a rare earth element, which are useful as phosphors. The nanocrystal oxides are produced by a micellar microemulsion process. In the process an aqueous solutions of the host and activator is prepared and added to a mixture of oil and a micelle forming surfactant and cosurfactant to form a first water in oil microemulsion. An aqueous solution of a hydroxide containing compound is added to a second mixture of oil and a micelle forming surfactant and cosurfactant to form a second water in oil microemulsion. The two microemulsions are added together which cause the micelle units to coalesce and decoalesce and to form a nanocrystalline hydroxide compound of the host and activator. The solution is washed and treated so as to remove byproducts. Thereafter the hydroxide compound is converted to an nanocrystalline activated oxide.

15 Claims, No Drawings

MICROEMULSION METHOD FOR PRODUCING ACTIVATED METAL OXIDE NANOCRYSTALS

BACKGROUND AND SUMMARY OF THE INVENTION

This invention relates to improved processes for producing activated (doped) quantum sized particles. More particularly this invention is directed to process for the production of metal oxide nanocrystalline phosphors activated with a rare earth element. The nanocrystal oxides are produced by a micellar microemulsion process which is reproducible, scalable and which provides a high yield of very small particles.

The unique physical properties of quantum sized particles (i.e. 1–10 nanometers in diameter, preferably less than 5 nm and most preferably less than 2 nm) called "nanocrystals" have attracted scientific interest. Because of their quantum size these nanocrystals exhibit properties that are far different from their bulk (larger sized) counterparts. However, the great majority of the quantum sized particles that have been studied and produced have been undoped. Doped (or "activated") quantum sized particles have unique properties which differ from non quantum sized particles of the same composition and from non-activated quantum sized particles.

In common terminology in the semiconductor art a host particle that has been "doped" generally refers to a particle that has less than 1.0% of the doping element. Despite the low percentage of the dopant the host has the properties of the doping particle. When the percentage of the dopant exceeds 1.0% the particle is generally referred to as an alloy. However, in certain applications, particularly when dealing with phosphors, the particle is referred to as doped even though it contains up to 10.0% of a "dopant" and it will act as if it were doped (ie. its properties are governed by the activator). Accordingly in this application we will refer to "activated" or "doped" host particles to include host particles which include an activator element. Thus $Y_2O_3$:Eu refers to a Yttrium oxide host doped or activated with Europium.

Only recently has work been done to produce doped quantum sized particles. In U.S. Pat. No. 5,522,377; issued Jun. 11, 1996 entitled "Encapsulated Quantum Sized Doped Semiconductor particles and method of manufacturing Same" there is disclosed an organometallic process for producing doped ZnS:Mn nanocrystals. However, the doped nanocrystals produced by this process have sulfide hosts. Sulfides and similar host compounds are highly reactive with air and other compounds which may render the nanocrystals unusable. Indeed, the nanocrystals produced by this process are encapsulated to reduce reactivity.

In U.S. Pat. No. 5,637,258; issued Jun. 10, 1997 entitled "Method for Producing Rare Earth Activated Metal Oxide Nanocrystals", of which one of the present inventors is a co inventor, there is disclosed a process for producing activated oxide (rather than a sulfide) nanocrystals by a "sol-gel" like process, rather than the organometallic processes previously used. However, this process can produce luminescence destroying organic byproducts which must be separated from the nanocrystals produced by the process.

The present invention is directed to a efficient, reproducible and scalable process for the production of metal oxide nanocrystals which when activated with a rare earth element are useful as phosphors. The nanocrystal oxides are produced by a microemulsion process. In the process an aqueous solution of the host and activator is prepared and added to a mixture of oil, a micelle forming surfactant and a cosurfactant to form a first water in oil microemulsion. An aqueous solution of a hydroxide containing compound is added to a second mixture of oil and a micelle forming surfactant and cosurfactant to form a second water in oil microemulsion. The two microemulsions are added together which cause the micelle units to coalesce and decoalesce and to form a nanocrystalline hydroxide compound of the host and activator. The solution is washed and treated so as to remove byproducts. Thereafter the hydroxide compound is heated or calcined to convert it to an nanocrystalline activated oxide.

The activator elements used in the present invention are the rare earth elements. In a doped or activated phosphor the characteristic light emitted by the phosphor when energized is controlled by the dopant or activator, not the host material such as yttrium oxide ($Y_2O_3$). When used as dopants or activators in phosphors the so called "rare earth" elements have narrow spectrum light emission. A phosphor doped with Europium (Eu) will emit red light, Terbium (Tb) will emit green and Thulium (Tm) blue. Thus phosphors doped with these three elements may be used to generate a full color RGB display device. Additionally, other rare earth dopants may be used to generate emissions outside of the visible spectrum, cerium (Ce) and gadolinium (Gd) will generate ultraviolet light and Erbium (Er) will emit infrared.

DETAILED DESCRIPTION OF THE PREFERRED EMBODIMENTS

The present invention is directed to a microemulsion methodology for producing activated metal oxide nanocrystals, which are particularly useful as phosphors when activated with rare earth elements. In the process, separate micellar water in oil microemulsions of the host and activator and an hydroxide containing compound are mixed to precipitate a nanocrystalline hydroxide compound of the host material doped with an activator. The hydroxide nanocrystals are thereafter separated, washed and converted to an oxide.

The process begins with the preparation of a first aqueous solution containing compounds of the host and activator. By way of example, chloride compounds of various metals used as hosts, such as yttrium and of rare earth activators, such as terbium and europium are readily commercially available. The compounds containing the host and activator materials are proportioned so that the amount of the activator compound is 1–20 molar % of the host containing compound which assures that the elements are in a host/activator (host/dopant) relationship rather than as an alloy. A second aqueous solution is then prepared which contains a hydroxide containing compound which will react with the compounds of the host and the activator. If the host and activator compounds are chlorides, then ammonium hydroxide $NH_4OH$ is a suitable candidate for the hydroxide compound. For the purposes of this general discussion the host and activator compound will be abbreviated as "Hst/Ac". Specific examples of the process steps will follow.

The reaction of the precursors takes place in a water-in-oil microemulsion. To this end, a first microemulsion is prepared which contains a suitable oil, such as octane, a polar cationic micelle forming surfactant, such as cetyl trimethyl ammonium bromide (CTAB) and a cosurfactant, which is usually an alcohol such as butanol. To this first oil and surfactant mixture is added the first aqueous solution containing the host and activator compound. The proportions of the first aqueous solution, the oil, the surfactant and the cosurfactant are adjusted so that they are above the "critical micelle concentration". This will form a first water in oil microemulsion with the aqueous solution encapsulated within the micelles. The cosurfactant (butanol) provides a tighter micelle and fills any interstices in the micelle structure A second Oil/CTAB/Butanol mixture is prepared and to this is added the second aqueous solution containing the hydroxide compound which in this case is ammonium hydroxide. This mixture is also proportioned so as to be above the critical micelle concentration so that the hydroxide compound is also present in a second water in oil micellar microemulsion. The first and second water in oil microemulsions are then mixed together which will cause a decolalescing and coalescing of the microemulsion droplets and an exchange of electrolytes between the host/activator solution with the hydroxide solution. This will cause a precipitation of a nanocrystalline hydroxide of the host and activator as well as an ammonium chloride byproduct, which is soluble in water as set forth in the following reaction:

$(Hst/Ac)Cl_3 + 3NH_4OH \Longrightarrow (Hst/Ac)(OH)_3 + 3NH_4Cl$

After precipitation of the hydroxide compound of the host and activator unreacted chlorides, micellar reactants and impurities are removed from the mixed aqueous solutions. This may be accomplished by a centrifugation at 3000 rpm for approximately 5 minutes which will collect the precursors. Thereafter the hydroxide compound of the host and activator will have a coating of surfactant and loose surfactant will also be present with the precipitate. To remove loose surfactant a sonification by ultrasound in water for 1 hour is performed which will make the nanocrystalline particles well dispersed and will dissolve the loose surfactant in the water. After this step there will be groups of nanocrystalline hydroxide particles in a clear aqueous solution. To collect the nanocrystalline hydroxide particles and to remove any remaining trapped surfactant an ultracentrifugation at 20,000–60,000 rpm is performed for approximately 10–30 minutes. After drying at 100° C. for approximately one hour, the nanocrystalline hydroxide particles may the be collected in the form of a powder.

The nanocrystalline hydroxide particles of the host material and activator will function as a phosphor, but such phosphors are not very efficient emitters of light as an identical oxide compound will have a greater emission of light by a full order of magnitude. Usually, hydroxide compounds are readily transformed into oxides by heating them in an air or oxygen atmosphere. However this approach will not work where the activator has different oxidation states such as 3+and 4+as the conversion of hydroxide to oxide in a different state which can greatly reduce light emission. For example europium has a 2+and 3+oxidation states; cerium, praseodymium and terbium have 3+and 4+oxidation states. Loss of light emission has been found to occur where the activator element in the produced nanocrystalline $(Hst/Ac)OH_3$ is in the 3+state and upon heating in air is converted into a 4+oxide.

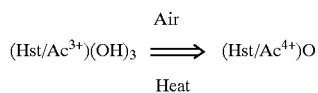

$(Hst/Ac^{3+})(OH)_3 \xrightarrow[\text{Heat}]{\text{Air}} (Hst/Ac^{4+})O$

The $(Hst/Ac)(OH)_3$ with the activator in the 3+state is a white powder that has some luminesce when exposed to UV radiation, but the $(Hst/Ac^{4+})O$, even though it is an oxide, is brown in color and is a very poor light emitter.

It has been found that the host/4+activator oxide can be converted into a host/3+activator oxide by a second heating step in a reducing atmosphere, such as carbon monoxide (CO):

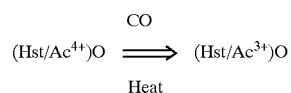

$(Hst/Ac^{4+})O \xrightarrow[\text{Heat}]{\text{CO}} (Hst/Ac^{3+})O$

The nanocrystalline 4+host/activator oxide is white in color and is a highly efficient emitter of light and is an excellent phosphor. Conversion can be accomplished by photoexitation above the band gap.

The following specific examples will provide detailed illustrations of the methods of producing and utilizing compositions of the present invention. These examples are not intended, however, to limit or restrict the scope of the invention in any way and should not be construed as providing conditions, parameters or values which must be utilized exclusively in order to practice the present invention.

In the examples to follow yttrium oxide nanocrystals with a terbium activator are prepared this nanocrystals are particularly suitable for use as phosphors. The nanocrystalline phosphors are less than 10 nm in size with a good distribution of particles that are smaller than 5 nm and 2 nm.

EXAMPLE 1

An 8 ml aqueous solution that is 96.4% $YCl_3$ and 3.6% Tb (molar ratio) is prepared from commercially available compounds. This aqueous solution is added to a mixture of 150 ml octane (working as an oil), 30 grams CTAB (surfactant) and 33 ml butanol (as a cosurfactant). This forms a first water in oil micellar microemulsion that is above the critical micelle concentration.

EXAMPLE 2

An 8 ml aqueous solution that is 10% $NH_4OH$ in water is prepared from commercially available compounds. This aqueous solution is added to a mixture of 150 ml octane (oil), 30 grams CTAB (surfactant) and 33 ml butanol (cosurfactant). This second micellar water in oil microemulsion is also above the critical micelle concentration.

EXAMPLE 3

The first and second water in oil microemulsions are then mixed together which will cause a decoalescing and coalescing of the microemulsion droplets and an exchange of electrolytes between the host and activator solution with the hydroxide solution. This will cause a precipitation of a nanocrystalline hydroxide solution of the host and activator as well as an ammonium chloride byproduct, which is soluble in water as set forth in the following reaction:

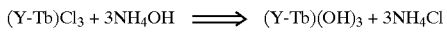

EXAMPLE 4

After precipitation of (Y—Tb)(OH)$_3$ in the form of a white nanocrystalline powder, unreacted chlorides, micellar reactants and impurities are removed from the mixed aqueous solutions. This may be accomplished a centrifugation at 3000 rpm for 10–30 minutes which will remove precursors. Thereafter the (Y—Tb)(OH)$_3$ will still have a coating of surfactant and loose surfactant will also be present. To remove the loose surfactant a sonification in water for 1 hour is performed which will make the nanocrystalline particles well dispersed and will dissolve the loose surfactant in the water. After this step there will be groups of (Y—Tb)(OH)$_3$ nanocrystal particles in a clear aqueous solution. To collect the particles and to remove any remaining trapped surfactant an ultracentrifugation at 20,000–60,000 rpm is performed for 10–30 minutes.

EXAMPLE 5

The (Y—Tb)(OH)$_3$ has the terbium in a 3+state and is first converted to an oxide in the 4+state by heating in air at 300–550° C. in an electric furnace for 1–5 hours, which provides the following reaction:

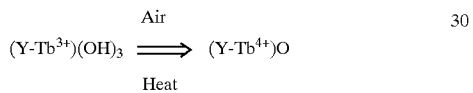

However, the (Y—Tb$^{+4}$)O is in the form of a brown powder and its luminescence is poor and a conversion to a 3+oxide is required to provide highly efficient phosphors.

EXAMPLE 5

To convert (Y—Tb$^{4+}$)O to (Y—Tb$^{3+}$)O a second heating is performed in a reducing atmosphere of carbon monoxide in an electric furnace at 300–550° C. for 1–2 hours which provides the following reaction:

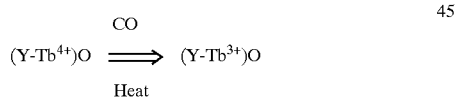

The (Y—Tb$^{3+}$)O is a white nanocrystalline powder which is highly luminescent and will efficiently emit green light upon exposure to UV radiation.

Electron microscopy of the yttrium oxide (Y$_2$O$_3$) nanocrystals doped with terbium produced by the present process indicates that the particles include a large quantity of 3–5 nm sized particles. Furthermore, PL/PLE spectra show that these nanocrystals are 6 to 7 times brighter than bulk (large sized) terbium doped yttrium oxide phosphors.

In addition to yttrium oxide (Y$_2$O$_3$) other suitable metal oxide hosts for production by the present process include zirconium oxide (ZrO$_2$), zinc oxide (ZnO), lead oxide (PbO), gadolinium oxide (Gd$_2$O$_3$), praseodymium oxide (Pr$_2$O$_3$), lanthanum oxide (La$_2$O$_3$), and copper oxide (CuO or Cu$_2$O) and their alloys. Suitable activators include the rare earth elements, (europium, terbium, thulium, cerium, gadolinium, holmium, samarium and neodymium). The transition metals (manganese, copper, silver, cobalt, nickel, and iron) may also be used as activators for various applications. The host and activator may also be supplied by compounds other than chlorides. The hydroxide compounds of the second micellar solution are used to provide the oxygen for the final oxide phosphor, other oxygen supplying compounds, such as carbonates, oxalates and citrates, among others, could be used to yield the oxygen for the reaction.

The invention has been described with respect to preferred embodiments. However, as those skilled in the art will recognize, modifications and variations in the specific details which have been described and illustrated may be resorted to without departing from the spirit and scope of the invention as defined in the appended claims.

What is claimed is:

1. A process for producing a metal oxide host nanocrystal with an activator comprising the steps of:
   a) preparing a first aqueous solution of a compound containing the metal ion of the metal oxide host and a compound containing the activator, with the amount of the activator compound being present in an amount 1–20 molar % of the compound containing the metal ion of the metal oxide host;
   b) preparing a second aqueous solution of a hydroxide containing compound that will react with the compounds of the first aqueous solution;
   c) preparing a first mixture of an oil and a cationic micelle forming surfactant and a cosurfactant;
   d) preparing a second mixture of an oil and a cationic micelle forming surfactant and a cosurfactant;
   e) adding the first aqueous solution to the first mixture, so as to form a first water in oil microemulsion of the first solution;
   f) adding the second aqueous solution to the second mixture, so as to form a second water in oil microemulsion of the second solution;
   g) mixing the first and second water in oil solutions together, to form a nanocrystalline hydroxide compound of the metal oxide host and activator;
   h) removing any byproducts from the mixed solutions;
   i) collecting the nanocrystalline reactants; and
   j) converting the nanocrystalline hydroxide compound of the metal oxide host and activator to an nanocrystalline oxide compound of the metal oxide host and activator.

2. The process as claimed in claim 1 wherein the activator is a rare earth activator selected from the group consisting of europium, terbium, thulium, cerium, gadolinium, holmium, samarium and neodymium.

3. The process as claimed in claim 1 wherein the host metal oxide is selected from the group consisting of the oxides of yttrium (Y), zirconium (Zr), zinc (Zn), gadolinium (Gd), praseodymium (Pr), lead (Pb), lanthanum (La), and copper (Cu).

4. The process as claimed in claim 1 wherein the step of converting the nanocrystalline hydroxide compound of the host and activator to an nanocrystalline oxide compound of the host and activator is a heating step.

5. The process as claimed in claim 4 wherein the heating step is done in two steps with a first heating step taking place in atmosphere of air followed by a second heating step in a reducing atmosphere.

6. The process as claimed in claim 1 wherein the cosurfactant is an alcohol.

7. The process as claimed in claim 1 wherein the cosurfactant is butanol.

8. The process as claimed in claim 1 wherein the oil of the first and second mixtures comprises octane.

9. The process as claimed in claim 1 wherein the surfactant is cetyl trimethyl ammonium bromide.

10. The process as claimed in claim 1 wherein the activator element is a transition metal selected from the group consisiting of manganese, copper, silver, cobalt, nickel, and iron.

11. A process for producing a yttrium oxide host nanocrystal with a activator having 3+ and 4+ oxidation states comprising the steps of:
   a) preparing a first aqueous solution of a compound containing yttrium and a compound containing the activator, with the amount of the activator compound being present in an amount 1–20 molar % of the yttrium containing compound;
   b) preparing a second aqueous solution of a hydroxide containing compound that will react with the compounds of the first aqueous solution;
   c) preparing a first mixture of an oil and a polar micelle forming surfactant and a cosurfactant;
   d) preparing a second mixture of an oil and a polar micelle forming surfactant and a cosurfactant;
   e) adding the first aqueous solution to the first mixture, so as to form a first water in oil micellar microemulsion of the first solution;
   f) adding the second aqueous solution to the second mixture, so as to form a second water in oil micellar microemulsion of the second solution;
   g) mixing the first and second water in oil micellar solutions together, to form a nanocrystalline hydroxide compound of yttrium and the activator;
   h) removing impurities any byproducts from the mixed solutions;
   i) collecting the nanocrystalline reactants; and
   j) heating the nanocrystalline hydroxide compound of the yttrium host and activator in air so as to convert the nanocrystalline hydroxide compound of the yttrium host and activator into a nanocrystalline oxide compound of the host and a +4 activator; and
   k) heating the nanocrystalline oxide compound of the yttrium host and +4 activator in a reducing atmosphere so as to convert into a nanocrystalline oxide compound of the yttrium host and a +3 activator.

12. The process as claimed in claim 11 wherein the activator element is selected from the group consisting of terbium, cerium, and praseodymium.

13. A process for producing a metal oxide host nanocrystal with a rare earth activator comprising the steps of:
   a) preparing a first aqueous solution of a compound containing the metal ion of the metal oxide host and a compound containing the rare earth activator, with the amount of the activator compound being present in an amount 1–20 molar % of the compound containing the metal ion of the metal oxide host;
   b) preparing a second aqueous solution of a hydroxide containing compound that will react with the compounds of the first aqueous solution;
   c) preparing a first mixture of an oil and a polar cationic micelle forming surfactant and a cosurfactant;
   d) preparing a second mixture of an oil and a polar cationic micelle forming surfactant and a cosurfactant;
   e) adding the first aqueous solution to the first mixture, so as to form a first water in oil microemulsion of the first solution,
   f) adding the second aqueous solution to the second mixture, so as to form a second water in oil microemulsion of the second solution;
   g) mixing the first and second water in oil solutions together to form a nanocrystalline hydroxide compound of the metal oxide host and rare earth activator;
   h) removing any byproducts from the mixed solutions;
   i) collecting the nanocrystalline reactants; and
   j) heating the nanocrystalline hydroxide compound of the metal oxide host and rare earth activator to convert it to an nanocrystalline oxide compound of the metal oxide host and rare earth activator.

14. The process as claimed in claim 13 wherein the rare earth activator has 3+ and 4+ oxidation states the heating step comprises two steps with a first heating step taking place in atmosphere of air followed by a second heating step in a reducing atmosphere.

15. The process as claimed in claim 13 wherein the host metal oxide is selected from the group consisting of the oxides of yttrium (Y), zirconium (Zr), zinc (Zn), gadolinium (Gd), praseodymium (Pr), lead (Pb), lanthanum (La), and copper (Cu).

* * * * *